UNITED STATES PATENT OFFICE.

WILLIAM L. HORNE, OF MERIDEN, ASSIGNOR TO THE HORNE VACUUM COMPANY, OF HARTFORD, CONNECTICUT.

ALCOHOLIC DISTILLATION.

SPECIFICATION forming part of Letters Patent No. 385,625, dated July 3, 1888.

Application filed May 14, 1887. Serial No. 238,240. (No specimens.)

*To all whom it may concern:*

Be it known that I, WILLIAM L. HORNE, a citizen of the United States, residing at Meriden, in the county of New Haven and State of Connecticut, have invented certain new and useful Improvements in Alcoholic Distillation; and I do hereby declare the following to be a full, clear, and exact description of the invention, such as will enable others skilled in the art to which it appertains to make and use the same.

My invention relates to the art of alcoholic distillation, or the distillation of alcohol from wine, cider, or other fermented fruit juices. In the fermentation of these substances, as soon as a certain amount of alcohol has been produced and is present in the liquor, which may be wine or other fermented liquor in like condition, the further fermentation or production of alcohol ceases before all the parts that go to make up this product have been transformed into the same. My process is based upon this fact, and has for its object such a manipulation of the fermented liquor as to obtain therefrom a valuable alcoholic product, referment the residue for the purpose of further distillation, or for such other uses as may be preferred.

To this end I take the fermented liquor and distill or otherwise extract the alcohol therein without heating said fermented liquor to such a point or changing its conditions so as to prevent fermentation, then place the liquor deprived of its alcohol in a condition and position favorable to fermentation and allow it to again ferment. In cases of wines rich in sugar under treatment the refermentation will produce further alcohol, and this fermented residual may be used in any way desired. It may, if preferred, be placed in the still and the alcohol removed, and the operation continued until no further alcohol is obtained. In the case of wines or other fermented liquors which have no free sugar or glucose after the removal of the alcohol acid fermentation may be allowed to proceed and the resultant liquor used for the purposes for which it may be found fitted; or these non-saccharine residuals may be treated by the addition of other saccharine matter, as hereinafter more fully explained.

The process of extracting the alcohol from the fermented liquor employed by me is vacuum distillation; but I do not limit myself thereto, as any other process which will accomplish the same results may be employed. I have also discovered that by taking the residual liquor after one or more fermentations and distillations and adding sugar, molasses, or other saccharine matter thereto, and allowing it to ferment, I obtain a wine or a like product and then distilling the refermented sweetened liquor, I obtain an alcoholic product not distinguishable from that obtained from the first distillation after the first fermentation of the fruit juices, such product having all the characteristics of the original distillate, though probably in a less degree.

By carrying my process with the original fermented liquor to its end I obtain from the fermented liquor double the amount of proof distillate that can be obtained from it by any of the known modes of treating such liquors without adding anything thereto, and by adding sugar and continuing the process I still further increase the yield and obtain three or four times the quantity of liquor usually obtained therefrom.

What I claim, and desire to secure by Letters Patent, is—

1. The process of extracting alcohol from the fermented juices of fruits and obtaining valuable residual products, which consists in extracting the alcohol therefrom and then fermenting the residual liquor, substantially as described.

2. The process of obtaining alcoholic products from the fermented juices of fruits, which consists in extracting the alcohol therefrom and then subjecting the residual liquor to refermentation and like redistillation, substantially as described.

3. The process of obtaining alcoholic products from the fermented juices of fruits, which consists in extracting the alcohol therefrom and adding saccharine matter to the residual liquor, and then subjecting the same to fermentation and then to redistillation, substantially as described.

In testimony whereof I affix my signature in presence of two witnesses.

WM. L. HORNE.

Witnesses:
E. T. WALKER,
A. H. WHITAKER.